US011577196B2

United States Patent
Ukai et al.

(10) Patent No.: US 11,577,196 B2
(45) Date of Patent: Feb. 14, 2023

(54) ELECTROCHEMICAL HYDROGEN PUMP (71) Applicant: Panasonic Intellectual Property Management Co., Ltd., Osaka (JP)

(72) Inventors: Kunihiro Ukai, Nara (JP); Takayuki Nakaue, Nara (JP); Hidenobu Wakita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 877 days.

(21) Appl. No.: 16/503,661

(22) Filed: Jul. 5, 2019

(65) Prior Publication Data
US 2020/0023306 A1    Jan. 23, 2020

(30) Foreign Application Priority Data

Jul. 23, 2018    (JP) .............................. JP2018-137544

(51) Int. Cl.
*B01D 53/32*    (2006.01)
*C01B 3/50*    (2006.01)
*H01M 16/00*    (2006.01)

(52) U.S. Cl.
CPC .............. *B01D 53/326* (2013.01); *C01B 3/50* (2013.01); *H01M 16/003* (2013.01)

(58) Field of Classification Search
CPC ................................. B01D 53/326; C01B 3/50
See application file for complete search history.

(56) References Cited

U.S. PATENT DOCUMENTS

| 6,054,230 A | 4/2000 | Kato |
| 10,301,179 B2* | 5/2019 | Sakai ........................ C01B 3/58 |
| 10,989,184 B2* | 4/2021 | Ukai ....................... F04B 37/04 |

(Continued)

FOREIGN PATENT DOCUMENTS

| JP | 8-213027 A | 8/1996 |
| JP | 2006-233297 | 9/2006 |

(Continued)

OTHER PUBLICATIONS

The Extended European Search Report dated Dec. 3, 2019 for the related European Patent Application No. 19187236.5.

*Primary Examiner* — Nicholas A Smith
(74) *Attorney, Agent, or Firm* — McDermott Will & Emery LLP (57) ABSTRACT

An electrochemical hydrogen pump includes an electrolyte membrane, an anode catalyst layer, a cathode catalyst layer, an anode gas diffusion layer, a cathode gas diffusion layer, an anode separator, a cathode separator, a first end plate and a second end plate that are disposed on the respective ends of at least one hydrogen pump unit in which the electrolyte membrane, the catalyst layers, the gas diffusion layers, and the separators are stacked on each other, a fastener that fastens the end plates and at least one hydrogen pump unit, and a voltage applier. The electrochemical hydrogen pump transfers hydrogen from the anode catalyst layer to the cathode catalyst layer and pressurizes hydrogen when the voltage applier applies the voltage. The cathode gas diffusion layer includes a water-repellent carbon fiber layer in a main surface thereof that is on a side of the cathode catalyst layer, and is compressed by the fastener.

8 Claims, 4 Drawing Sheets

(56) References Cited

U.S. PATENT DOCUMENTS

| | | | |
|---|---|---|---|
| 2003/0232234 A1* | 12/2003 | Cisar | H01M 8/0206 |
| | | | 429/437 |
| 2006/0199061 A1 | 9/2006 | Fiebig et al. | |
| 2006/0201800 A1 | 9/2006 | Nakazawa et al. | |
| 2007/0202388 A1 | 8/2007 | Koehler et al. | |
| 2016/0208791 A1* | 7/2016 | Reeh | F04B 45/02 |
| 2018/0155193 A1 | 6/2018 | Sakai et al. | |
| 2019/0383283 A1* | 12/2019 | Ukai | C25B 1/02 |

FOREIGN PATENT DOCUMENTS

| | | |
|---|---|---|
| JP | 2006-307248 | 11/2006 |
| JP | 2007-051369 A | 3/2007 |
| JP | 2008-518387 | 5/2008 |
| JP | 2018-081812 A | 5/2018 |
| JP | 2018-090899 A | 6/2018 |
| WO | 2006/036606 | 4/2006 |

* cited by examiner

ELECTROCHEMICAL HYDROGEN PUMP

BACKGROUND

1. Technical Field

The present disclosure relates to an electrochemical hydrogen pump.

2. Description of the Related Art

Considering environmental problems, such as global warming, and energy problems, such as depletion of oil resources, hydrogen has been focused on as a clean alternative energy source in place of fossil fuels. Essentially, burning hydrogen produces only water, carbon dioxide, which contributes to global warming, is not produced, and few quantities of other compounds, such as nitrogen oxides, are produced. Thus, hydrogen is anticipated as a clean energy source. Fuel cells, an example of devices that use hydrogen highly efficiently as a fuel, have been developed and widely used for automotive power sources and home power generation.

In an upcoming hydrogen society, development of technology for storing hydrogen at high density and transporting and using hydrogen in a reduced volume at low cost is required in addition to development of technology for producing hydrogen. In particular, to encourage the spread of such fuel cells as distributed energy sources, a hydrogen supply infrastructure needs to be established. Furthermore, various investigations such as methods for producing and purifying hydrogen and storing purified hydrogen at high density, have been conducted to provide a stable hydrogen supply.

For example, Japanese Unexamined Patent Application Publication (Translation of PCT Application) No. 2008-518387 suggests an ion pump that purifies and compresses hydrogen and that includes a stack of a solid polymer electrolyte membrane, electrodes, and separators, with the stack sandwiched between end plates and fastened.

SUMMARY

In the prior art, the improvement in the efficiency of the electrochemical hydrogen pump during the hydrogen pressurizing operation is not fully investigated.

One aspect of the present disclosure is developed in consideration of the foregoing, and one non-limiting and exemplary embodiment provides an electrochemical hydrogen pump that can improve the efficiency during the hydrogen pressurizing operation, compared with that in the prior art.

To solve the foregoing problem, in one general aspect, the techniques disclosed here feature an electrochemical hydrogen pump including an electrolyte membrane, an anode catalyst layer disposed on one main surface of the electrolyte membrane, a cathode catalyst layer disposed on the other main surface of the electrolyte membrane, an anode gas diffusion layer disposed on the anode catalyst layer, a cathode gas diffusion layer disposed on the cathode catalyst layer, an anode separator disposed on the anode gas diffusion layer, a cathode separator disposed on the cathode gas diffusion layer, a first end plate and a second end plate that are disposed on respective ends of at least one hydrogen pump unit in a stacking direction in which the electrolyte membrane, the anode catalyst layer, the cathode catalyst layer, the anode gas diffusion layer, the cathode gas diffusion layer, the anode separator, and the cathode separator are stacked on each other in the at least one hydrogen pump unit, a fastener that fastens the at least one hydrogen pump unit, the first end plate, and the second end plate in the stacking direction, and a voltage applier that applies a voltage between the anode catalyst layer and the cathode catalyst layer. The electrochemical hydrogen pump transfers, to the cathode catalyst layer, hydrogen in a hydrogen-containing gas that has been supplied to the anode catalyst layer and pressurizes the hydrogen when the voltage applier applies the voltage. The cathode gas diffusion layer includes a water-repellent carbon fiber layer in a main surface of the cathode gas diffusion layer that is on a side of the cathode catalyst layer, and is compressed due to fastening of the fastener.

The electrochemical hydrogen pump according to one aspect of the present disclosure exhibits an effect of improving the efficiency during the hydrogen pressurizing operation, compared with that in the prior art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In an electrochemical hydrogen pump using a solid polymer electrolyte membrane (hereinafter, an electrolyte membrane), hydrogen ($H_2$) in the hydrogen-containing gas in the anode is protonated and transferred to the cathode, and thereafter, protons (H+) are converted into hydrogen ($H_2$) in the cathode, thereby pressurizing hydrogen. In such a case, to reliably obtain the high proton conductivity of the electrolyte membrane, the electrolyte membrane needs to be maintained in a desired wet condition. In other words, the wet state of the electrolyte membrane directly relates to the electric resistance of the electrolyte membrane and is an important factor that affects the cell resistance of the electrochemical hydrogen pump. Thus, for example, the electrochemical hydrogen pump typically has a structure in which the hydrogen-containing gas to be supplied to the anode is previously humidified by a humidifier.

When the current flows between the anode and the cathode of an electrochemical hydrogen pump, protons transfer with water from the anode to the cathode through the electrolyte membrane. Water transferred from the anode to the cathode is in the vapor state when the operation temperature of the electrochemical hydrogen pump is equal to or higher than a predetermined temperature. As the hydrogen gas pressure in the cathode increases, the percentage of liquid water increases. When liquid water is present in the cathode, such water is partially transferred back to the anode due to a difference in pressure between the cathode and the anode. The amount of water transferred back to the anode increases as the hydrogen gas pressure in the cathode increases. Then, as the hydrogen gas pressure in the cathode increases, water transferred back to the anode is likely to cause flooding of the anode. When the diffusivity of the hydrogen-containing gas in the anode is degraded due to the occurrence of such a flooding, the diffusion resistance of the electrochemical hydrogen pump may increase. This may degrade the efficiency of the hydrogen pressurizing operation of the electrochemical hydrogen pump.

The higher the hydrogen gas pressure in the cathode, the larger the amount of compression (amount of distortion) of the electrolyte membrane, the anode catalyst layer, and the anode gas diffusion layer due to the hydrogen gas pressure. Then, a gap is likely to be generated between the cathode catalyst layer and the cathode gas diffusion layer, and thus, the contact resistance therebetween may increase. Considering the foregoing, in the electrochemical hydrogen pump of the prior patent of the applicant, a structure in which before fastening of the electrochemical hydrogen pump due to the fastener, the cathode gas diffusion layer is disposed in the recess of the cathode separator so as to protrude from the recess by a predetermined amount in the thickness direction has been proposed. In other words, due to fastening of the fastener, the cathode gas diffusion layer can be compressed in the thickness direction. Thus, if the hydrogen gas pressure in the cathode increases, the cathode gas diffusion layer elastically deforms in a direction in which the thickness after compression due to the fastener returns to the thickness before compression. Accordingly, the contact between the cathode catalyst layer and the cathode gas diffusion layer can be appropriately maintained.

Such a structure in which the cathode gas diffusion layer is compressed in the thickness direction due to fastening of the fastener, however, has a risk of promoting the occurrence of the above flooding of the anode. Specifically, due to the above structure, the number of voids of the cathode gas diffusion layer decreases, thereby preventing the flow of hydrogen in the cathode gas diffusion layer. Then, the amount of water discharged with the flow of hydrogen from the cathode decreases, thereby increasing the amount of water temporally retained in the cathode gas diffusion layer. As a result, the amount of water transferred back to the anode due to a difference in pressure between the cathode and the anode further increases, thereby promoting the occurrence of flooding of the anode.

The inventors conducted a thorough investigation, found that the cathode gas diffusion layer including a water-repellent carbon fiber layer in a main surface thereof that is on a side of the cathode catalyst layer can suppress the occurrence of the above flooding of the anode, and achieved the following one aspect of the present disclosure.

An electrochemical hydrogen pump according to a first aspect of the present disclosure includes an electrolyte membrane, an anode catalyst layer disposed on one main surface of the electrolyte membrane, a cathode catalyst layer disposed on the other main surface of the electrolyte membrane, an anode gas diffusion layer disposed on the anode catalyst layer, a cathode gas diffusion layer disposed on the cathode catalyst layer, an anode separator disposed on the anode gas diffusion layer, a cathode separator disposed on the cathode gas diffusion layer, a first end plate and a second end plate that are disposed on respective ends of at least one hydrogen pump unit in a stacking direction in which the electrolyte membrane, the anode catalyst layer, the cathode catalyst layer, the anode gas diffusion layer, the cathode gas diffusion layer, the anode separator, and the cathode separator are stacked on each other in the at least one hydrogen pump unit, a fastener that fastens the at least one hydrogen pump unit, the first end plate, and the second end plate in the stacking direction, and a voltage applier that applies a voltage between the anode catalyst layer and the cathode catalyst layer. The electrochemical hydrogen pump transfers, to the cathode catalyst layer, hydrogen in a hydrogen-containing gas that has been supplied to the anode catalyst layer and pressurizes the hydrogen when the voltage applier applies the voltage. The cathode gas diffusion layer includes a water-repellent carbon fiber layer in a main surface of the cathode gas diffusion layer that is on a side of the cathode catalyst layer, and is compressed due to fastening of the fastener.

According to such a structure, the electrochemical hydrogen pump according to the present aspect can improve the efficiency during the hydrogen pressurizing operation, compared with that in the prior art.

Specifically, in the electrochemical hydrogen pump according to the present aspect, the cathode gas diffusion layer includes a water-repellent carbon fiber layer in a main surface of the cathode gas diffusion layer that is on the side of the cathode catalyst layer. The water repellency of the carbon fiber layer suppresses transfer of cathode water outside the carbon fiber layer back to the anode due to the difference in pressure between the cathode and the anode. As a result, water outside the carbon fiber layer is likely to be discharged with hydrogen from the cathode to the outside. Note that when a side of the carbon fiber layer that is on the side of the cathode catalyst layer is referred to as the inside of the carbon fiber layer, the outside of the carbon fiber layer refers to the opposite side of the carbon fiber layer.

Accordingly, the electrochemical hydrogen pump according to the present aspect suppresses the occurrence of flooding of the anode and thus can decrease the risk of degrading the diffusivity of the hydrogen-containing gas in the anode, compared with an electrochemical hydrogen pump in which the cathode gas diffusion layer does not include the water-repellent carbon fiber layer. Therefore, the electrochemical hydrogen pump according to the present aspect reduces an increase in the diffusion resistance of the electrochemical hydrogen pump and thus can improve the efficiency during the hydrogen pressurizing operation.

In the electrochemical hydrogen pump according to the present aspect, if the electrolyte membrane, the anode catalyst layer, and the anode gas diffusion layer are each compressed and deform due to a difference in pressure between the anode and the cathode during the operation of the electrochemical hydrogen pump, the cathode gas diffusion layer elastically deforms in a direction in which the thickness after compression due to the fastener returns to the original thickness before compression, and thus, the contact between the cathode catalyst layer and the cathode gas diffusion layer can be appropriately maintained.

The electrochemical hydrogen pump according to a second aspect of the present disclosure is the electrochemical hydrogen pump according to the first aspect, in which the amount of compression of the cathode gas diffusion layer in the stacking direction due to fastening of the fastener may be equal to or larger than the sum of the amounts of distortion of the electrolyte membrane, the anode catalyst layer, and the anode gas diffusion layer in the stacking direction under the maximum pressure of the electrochemical hydrogen pump.

According to such a structure, in the electrochemical hydrogen pump according to the present aspect, the amount of compression of the cathode gas diffusion layer in the stacking direction due to fastening of the fastener is appropriately determined in consideration of the sum of the amounts of distortion of the electrolyte membrane, the anode catalyst layer, and the anode gas diffusion layer in the stacking direction under the maximum pressure of the electrochemical hydrogen pump. Accordingly, the electrochemical hydrogen pump according to the present aspect can appropriately maintain the contact between the cathode catalyst layer and the cathode gas diffusion layer under the maximum pressure of the electrochemical hydrogen pump.

The electrochemical hydrogen pump according to a third aspect of the present disclosure is the electrochemical hydrogen pump according to the first aspect or the second aspect, in which the amount of compression of the cathode gas diffusion layer in the stacking direction due to fastening of the fastener may be 20% to 30% of the thickness of the cathode gas diffusion layer before fastening of the fastener.

The amount of compression of the cathode gas diffusion layer in the stacking direction due to fastening of the fastener is desirably 20% to 30% of the thickness of the cathode gas diffusion layer before fastening of the fastener, from the viewpoint of maintaining the resistance of the cathode gas diffusing layer low stably. This has been confirmed by conducting a test in which the cathode gas diffusion layer is compressed in the thickness direction. The detail will be described in a second example.

The electrochemical hydrogen pump according to a fourth aspect of the present disclosure is the electrochemical hydrogen pump according to the first aspect or the second aspect, in which the amount of compression of the cathode gas diffusion layer in the stacking direction due to fastening of the fastener may be equal to higher than 10% of the thickness of the cathode gas diffusion layer before fastening of the fastener.

The amount of compression of the cathode gas diffusion layer in the stacking direction due to fastening of the fastener is desirably equal to higher than 10% of the thickness of the cathode gas diffusion layer before fastening of the fastener, from the viewpoint of suppressing an increase in the resistance of the cathode gas diffusing layer appropriately. This has been confirmed by conducting a test in which the cathode gas diffusion layer is compressed in the thickness direction. The detail will be described in the second example.

An electrochemical hydrogen pump according to a fifth aspect of the present disclosure is any one of the electrochemical hydrogen pumps according to the first to fourth aspects, which may include a water-repellent layer containing a water-repellent resin and carbon black on a main surface of the water-repellent carbon fiber layer that is on the side of the cathode catalyst layer.

According to such a structure, the electrochemical hydrogen pump according to the present aspect includes a water-repellent layer containing a water-repellent resin and carbon black, so that the water-repellent carbon fiber layer and the water-repellent layer can enable the cathode gas diffusion layer to exhibit water repellency effectively.

The electrochemical hydrogen pump according to the present aspect includes the water-repellent layer between the carbon fiber layer and the cathode catalyst layer, so that the water-repellent layer can also function as a protective layer that can appropriately prevent the carbon fibers from piercing the cathode catalyst layer and the electrolyte membrane.

An electrochemical hydrogen pump in a sixth aspect of the present disclosure is any one of the electrochemical hydrogen pumps according to the first to fifth aspects, in which, in a main surface of the water-repellent carbon fiber layer that is on the side of the cathode catalyst layer, the water-repellent carbon fiber layer may include a mixture layer in which the water-repellent carbon fiber layer and a water-repellent layer containing a water-repellent resin and carbon black are mixed together.

According to such a structure, the electrochemical hydrogen pump according to the present aspect has a mixture layer in which carbon fibers have water repellency and in which a water-repellent resin and carbon black are present in the voids between the carbon fibers, so that the cathode gas diffusion layer can exhibit water repellency effectively.

An electrochemical hydrogen pump according to a seventh aspect of the present disclosure is any one of the electrochemical hydrogen pumps according to the first to sixth aspects, in which the anode gas diffusion layer may include a metal sheet including a plurality of ventilation pores and may include none of the carbon fiber layer.

A metal sheet typically has higher stiffness than a carbon fiber layer. The electrochemical hydrogen pump according to the present aspect has a structure in which the anode gas diffusion layer does not include a carbon fiber layer, so that the anode gas diffusion layer can have high stiffness and suppress displacement and deformation of the component members due to a difference in pressure between the anode and the cathode during the operation of the electrochemical hydrogen pump.

An electrochemical hydrogen pump according to an eighth aspect of the present disclosure is the electrochemical hydrogen pump according to the seventh aspect, in which the anode gas diffusion layer may include a water-repellent layer in a main surface of the anode gas diffusion layer that is on a side of the anode catalyst layer.

In such a water-repellent layer, water in the anode is likely to transfer with the hydrogen-containing gas to the outside of the anode due to the flow of the hydrogen-containing gas in the anode. In the electrochemical hydrogen pump according to the present aspect, the anode gas diffusion layer includes a water-repellent layer in a main surface thereof that is on the side of the anode catalyst layer. This improves a state in which excessive water is retained in the anode gas diffusion layer, thereby suppressing the occurrence of flooding of the anode appropriately.

An electrochemical hydrogen pump according to a ninth aspect of the present disclosure is any one of the electrochemical hydrogen pumps according to the first to seventh aspects, in which at least one hydrogen pump unit may include a plurality of hydrogen pump units.

Hereinafter, with reference to the drawings, the embodiments of the present disclosure will be described. The embodiments described below each illustrate an example of the above aspects. Thus, shapes, materials, components, and the positions and connection modes of the components, which will be described below, are examples and do not limit the above aspects provided that they are not described in Claims. Among the components described below, components not described in the independent Claim showing the broadest concept of the above aspects are described as optional components. In the drawings, description of one of components with the same symbol may be omitted. In the drawings, the components are schematically drawn to facilitate the understanding, so that shapes and dimensional ratios in the drawings may differ from those of actual components.

Embodiment

Structure of Electrochemical Hydrogen Pump

Figure 1A:
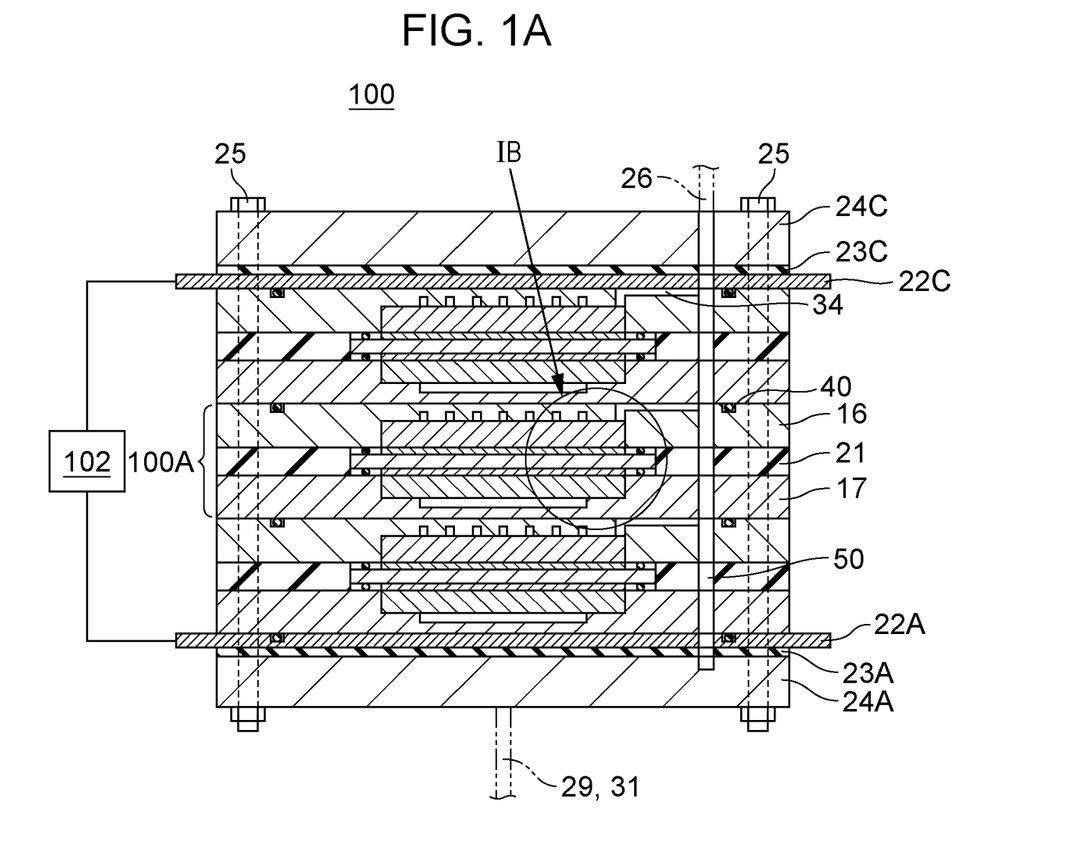
FIG. 1A is a view of an exemplary electrochemical hydrogen pump according to an embodiment.
Figure 1B:
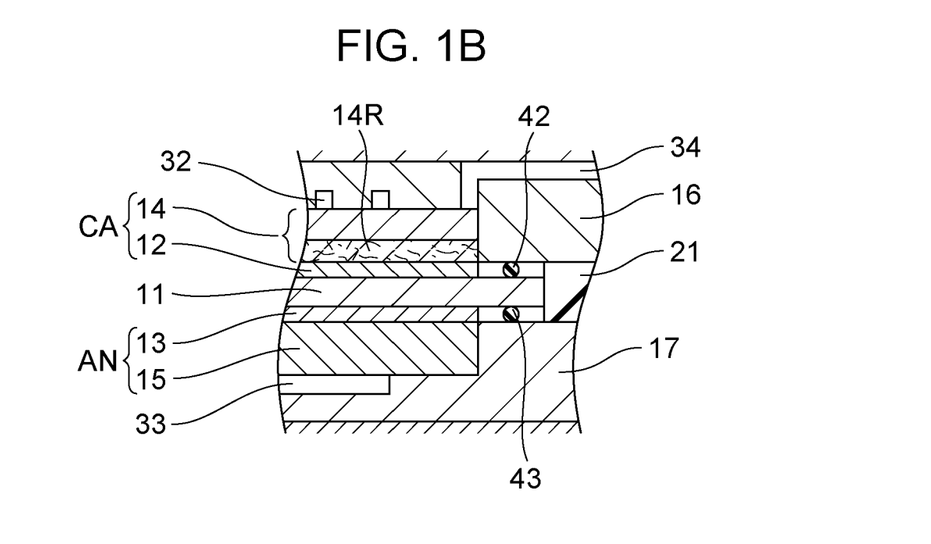
FIG. 1B is an enlarged view of portion IB of the electrochemical hydrogen pump in FIG. 1A.
Figure 2A:
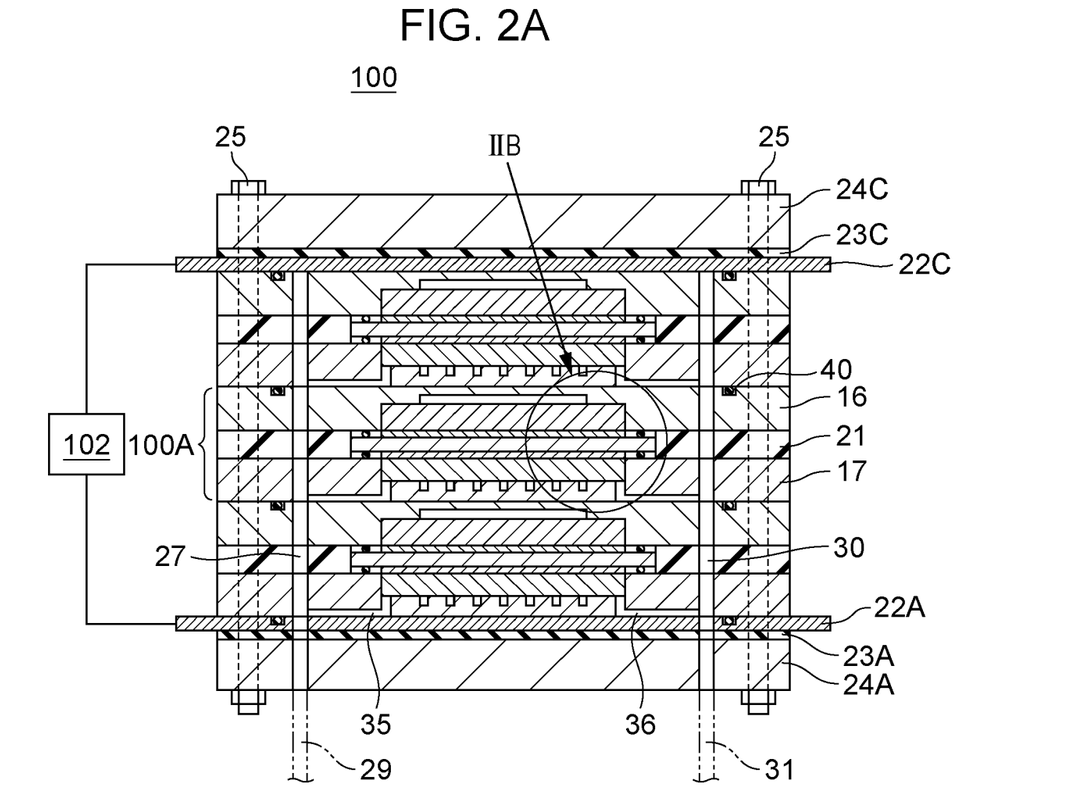
FIG. 2A is a view of an exemplary electrochemical hydrogen pump according to the embodiment.
Figure 2B:
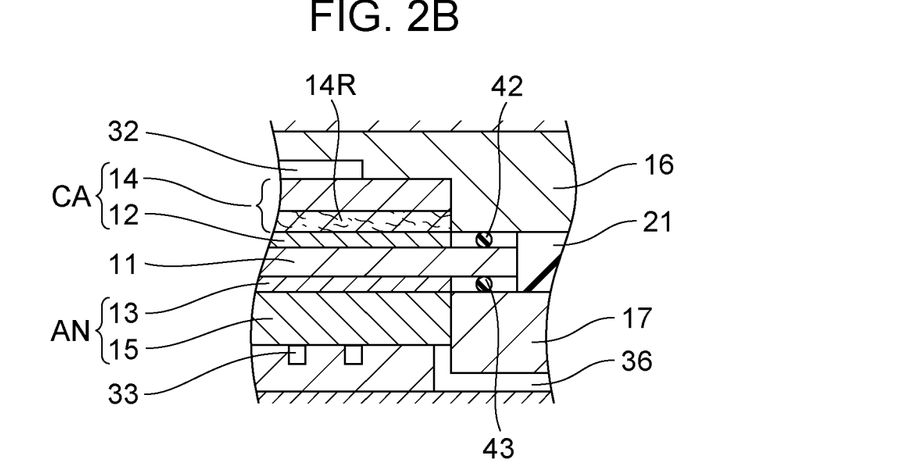
FIG. 2B is an enlarged view of portion IIB of the electrochemical hydrogen pump in FIG. 2A.

FIG. 1A and FIG. 2A are each a view of an exemplary electrochemical hydrogen pump according to an embodiment. FIG. 1B is an enlarged view of portion IB of the electrochemical hydrogen pump in FIG. 1A. FIG. 2B is an enlarged view of portion IIB of the electrochemical hydrogen pump in FIG. 2A.

FIG. 1A is a vertical cross-sectional view of an electrochemical hydrogen pump 100, including a straight line passing through the center of the electrochemical hydrogen pump 100 and the center of a cathode gas exhaust manifold 50 in plain view. FIG. 2A is a vertical cross-sectional view of the electrochemical hydrogen pump 100, including a straight line passing through the center of the electrochemical hydrogen pump 100, the center of an anode gas intake manifold 27, and the center of an anode gas exhaust manifold 30 in plain view.

In the examples illustrated in FIG. 1A and FIG. 2A, the electrochemical hydrogen pump 100 includes at least one hydrogen pump unit 100A.

In the electrochemical hydrogen pump 100, a plurality of the hydrogen pump units 100A are stacked on each other. In FIG. 1A and FIG. 2A, three hydrogen pump units 100A are stacked on each other; however, the number of the hydrogen pump units 100A is not limited thereto. In other words, the number of the hydrogen pump units 100A can be appropriately determined in accordance with operating conditions, such as the amount of hydrogen pressurized by the electrochemical hydrogen pump 100.

The hydrogen pump unit 100A includes an electrolyte membrane 11, an anode AN, a cathode CA, a cathode separator 16, an anode separator 17, and an insulator 21. In the hydrogen pump unit 100A, the electrolyte membrane 11, an anode catalyst layer 13, a cathode catalyst layer 12, an anode gas diffusion layer 15, a cathode gas diffusion layer 14, the anode separator 17, and the cathode separator 16 are stacked on each other.

The anode AN is disposed on one main surface of the electrolyte membrane 11. The anode AN is an electrode including the anode catalyst layer 13 and the anode gas diffusion layer 15. An annular sealing member 43 is disposed so as to surround the periphery of the anode catalyst layer 13 in plain view to appropriately seal the anode catalyst layer 13.

The cathode CA is disposed on the other main surface of the electrolyte membrane 11. The cathode CA is an electrode including the cathode catalyst layer 12 and the cathode gas diffusion layer 14. An annular sealing member 42 is disposed so as to surround the periphery of the cathode catalyst layer 12 in plain view to appropriately seal the cathode catalyst layer 12.

Accordingly, the electrolyte membrane 11 is sandwiched between the anode AN and the cathode CA so as to be in contact with the anode catalyst layer 13 and the cathode catalyst layer 12. A stack of the cathode CA, the electrolyte membrane 11, and the anode AN is referred to as a membrane electrode assembly (hereinafter, MEA).

The electrolyte membrane 11 has proton conductivity. The electrolyte membrane 11 may have any structure provided that the electrolyte membrane 11 has proton conductivity. Examples of the electrolyte membrane 11 include, but are not limited to, fluorine-based polymer electrolyte membranes and hydrocarbon-based polymer electrolyte membranes. Specifically, Nafion (trade name, manufactured by Du Pont) or Aciplex (trade name, manufactured by Asahi Kasei Corp.) may be used as the electrolyte membrane 11.

The anode catalyst layer 13 is disposed on one main surface of the electrolyte membrane 11. The anode catalyst layer 13 includes a catalytic metal. The catalytic metal may be, but is not limited to, platinum.

The cathode catalyst layer 12 is disposed on the other main surface of the electrolyte membrane 11. The cathode catalyst layer 12 includes a catalytic metal. The catalytic metal may be, but is not limited to, platinum.

Examples of a catalyst carrier of the cathode catalyst layer 12 and the anode catalyst layer 13 include, but are not limited to, carbon powders, such as carbon black and graphite, and conductive oxide powders.

In the cathode catalyst layer 12 and the anode catalyst layer 13, highly dispersed catalytic metal particulates are supported on the catalyst carrier. An ionomer constituent having hydrogen ion conductivity is typically added to the cathode catalyst layer 12 and the anode catalyst layer 13 to increase the electrode reaction area.

The cathode gas diffusion layer 14 is disposed on the cathode catalyst layer 12. The cathode gas diffusion layer 14 contains a porous material. The cathode gas diffusion layer 14 is conductive and has gas diffusivity. Furthermore, the cathode gas diffusion layer 14 desirably has elasticity so as to appropriately follow displacement and deformation of the component members due to a difference in pressure between the cathode CA and the anode AN during the operation of the electrochemical hydrogen pump 100. In the electrochemical hydrogen pump 100 according to the present embodiment, a member containing carbon fibers is used as the cathode gas diffusion layer 14. The member may be a porous carbon-fiber sheet, such as carbon paper, carbon cloth, or carbon felt. The base material of the cathode gas diffusion layer 14 may be other than a carbon-fiber sheet. Examples of the base material of the cathode gas diffusion layer 14 include sintered bodies of a metal fiber made of a material, such as titanium, a titanium alloy, or stainless steel, and sintered bodies of a metal powder made of such a material.

When the base material of the cathode gas diffusion layer 14 is not a carbon-fiber sheet, a water-repellent carbon fiber layer is disposed in a main surface of the cathode gas diffusion layer 14 that is on the side of the cathode catalyst layer 12.

As illustrated in FIGS. 1B and 2B, the cathode gas diffusion layer 14 includes a water-repellent carbon fiber layer 14R in a main surface thereof that is on the side of the cathode catalyst layer 12. A material containing a water-repellent resin, such as a fluorine-based resin, may be applied to the cathode gas diffusion layer 14 containing carbon fibers to enable the carbon fibers in the carbon fiber layer 14R to exhibit water repellency. The cathode gas diffusion layer 14 containing carbon fibers may be impregnated with a material containing the above water-repellent resin to enable the carbon fibers to exhibit water repellency. The material containing a water-repellent resin may be a solution in which PTFE particulates are dispersed in the solvent. The method for applying such a material may be a spray application method. Such a method for forming the water-repellent carbon fiber layer 14R and the structure thereof are examples, and the method and the structure are not limited to the examples.

The cathode gas diffusion layer 14 itself may be the water-repellent carbon fiber layer 14R. Such a cathode gas diffusion layer 14 includes a carbon fiber layer and is produced by impregnating the carbon fiber layer with a solution containing a water-repellent resin.

In other words, in the present disclosure, at least a main surface of the cathode gas diffusion layer 14 that is on the side of the cathode catalyst layer 12 is the water-repellent carbon fiber layer 14R.

The cathode CA in the hydrogen pump unit 100A may include a water-repellent layer containing a water-repellent resin, such as a fluorine-based resin, and carbon black. Specific examples of such a water-repellent layer will be described in the second example and a third example.

The anode gas diffusion layer 15 is disposed on the anode catalyst layer 13. The anode gas diffusion layer 15 includes a porous material. The anode gas diffusion layer 15 is conductive and has gas diffusivity. Furthermore, the anode gas diffusion layer 15 desirably has high stiffness and suppresses displacement and deformation of the component members due to a difference in pressure between the cathode CA and the anode AN during the operation of the electrochemical hydrogen pump 100.

In the electrochemical hydrogen pump 100 according to the present embodiment, the anode gas diffusion layer 15 may be, but is not limited to, a member including a thin plate of a sintered body of a titanium powder. In other words, as described above, examples of the base material of the anode gas diffusion layer 15 include sintered bodies of a metal fiber made of a material, such as titanium, a titanium alloy, or stainless steel, and sintered bodies of a metal powder made of such a material. Examples of the base material of the anode gas diffusion layer 15 also include expanded metals, metal meshes, and punching metals.

The anode separator 17 is a member disposed on the anode gas diffusion layer 15 in the anode AN. The cathode separator 16 is a member disposed on the cathode gas diffusion layer 14 in the cathode CA.

Each of the cathode separator 16 and the anode separator 17 has a recess in the center portion thereof. The cathode gas diffusion layer 14 is placed in the recess of the cathode separator 16. The anode gas diffusion layer 15 is placed in the recess of the anode separator 17.

The hydrogen pump unit 100A is formed by sandwiching the MEA between the cathode separator 16 and the anode separator 17.

In plain view, for example, a serpentine cathode gas flow channel 32 including a plurality of U-shaped curve portions and a plurality of straight portions is disposed in a main surface of the cathode separator 16 that is in contact with the cathode gas diffusion layer 14. The straight portions of the cathode gas flow channel 32 extend in a direction perpendicular to the sheet surface of FIG. 1A. The cathode gas flow channel 32 is an example, and the cathode gas flow channel is not limited to the example. The cathode gas flow channel may include a plurality of straight channels.

In plain view, for example, a serpentine anode gas flow channel 33 including a plurality of U-shaped curve portions and a plurality of straight portions is disposed in a main surface of the anode separator 17 that is in contact with the anode gas diffusion layer 15. The straight portions of the anode gas flow channel 33 extend in a direction perpendicular to the sheet surface of FIG. 2A. The anode gas flow channel 33 is an example, and the anode gas flow channel is not limited to the example. The anode gas flow channel may include a plurality of straight channels.

The annular plate-like insulator 21, which is disposed so as to surround the periphery of the MEA, is sandwiched between the conductive cathode separator 16 and the conductive anode separator 17. This prevents a short circuit between the cathode separator 16 and the anode separator 17.

The electrochemical hydrogen pump 100 includes a first end plate and a second end plate that are disposed on respective ends of the hydrogen pump units 100A in the stacking direction and includes a fastener 25 that fastens the hydrogen pump units 100A, the first end plate, and the second end plate in the stacking direction.

In examples in FIGS. 1A and 2A, a cathode end plate 24C and an anode end plate 24A respectively correspond to the first end plate and the second end plate. In other words, the anode end plate 24A is an end plate disposed below the anode separator 17 positioned at one end in a stacking direction in which the members in the hydrogen pump unit 100A are stacked on each other. The cathode end plate 24C is an end plate disposed above the cathode separator 16 positioned at the other end in a direction in which the members in the hydrogen pump unit 100A are stacked on each other.

The fastener 25 may have any structure provided that the fastener 25 can fasten the hydrogen pump unit 100A, the cathode end plate 24C, and the anode end plate 24A in the stacking direction.

The fastener 25 may include a bolt and a nut with a disc spring.

The bolt of the fastener 25 may pass through only the anode end plate 24A and the cathode end plate 24C; however, in the electrochemical hydrogen pump 100 according to the present embodiment, the bolt passes through the members of the three-stacked hydrogen pump units 100A, a cathode power feeder plate 22C, a cathode insulating plate 23C, an anode power feeder plate 22A, an anode insulating plate 23A, the anode end plate 24A, and the cathode end plate 24C. The fastener 25 applies a desired fastening pressure to the hydrogen pump units 100A sandwiched between the cathode end plate 24C and the anode end plate 24A in a state in which the cathode end plate 24C presses the top surface of the cathode separator 16 positioned at the other end in the stacking direction, with the cathode power feeder plate 22C and the cathode insulating plate 23C disposed between the cathode end plate 24C and the cathode separator 16, and in which the anode end plate 24A presses the bottom surface of the anode separator 17 positioned at one end in the stacking direction, with the anode power feeder plate 22A and the anode insulating plate 23A disposed between the anode end plate 24A and the anode separator 17.

Accordingly, in the electrochemical hydrogen pump 100 according to the present embodiment, the fastening pressure of the fastener 25 appropriately holds the three-stacked hydrogen pump units 100A in a stacked state in the stacking direction, and the bolt of the fastener 25 passes through the members in the electrochemical hydrogen pump 100. This appropriately suppresses the movement of the members in the in-plane direction.

In the electrochemical hydrogen pump 100 according to the present embodiment, the cathode gas flow channels 32, in which the cathode gas flowing out from the respective cathode gas diffusion layers 14 in the hydrogen pump units 100A flows, are connected to each other. Hereinafter, the structure of the cathode gas flow channels 32 connected to each other will be described with reference to the drawings.

As illustrated in FIG. 1A, the cathode gas exhaust manifold 50 includes through holes formed in the cathode end plate 24C and the members of the three-stacked hydrogen pump units 100A and a non-through hole formed in the anode end plate 24A, and the through holes and the non-through hole are connected to each other. A cathode gas exhaust channel 26 is disposed on the cathode end plate 24C. The cathode gas exhaust channel 26 may include a pipe in which the hydrogen ($H_2$) discharged from the cathode CA flows. The cathode gas exhaust channel 26 is connected to the cathode gas exhaust manifold 50.

Furthermore, the cathode gas exhaust manifold 50 is connected to one end portion of each of the cathode gas flow channels 32 in the hydrogen pump units 100A through respective cathode gas passing channels 34. Accordingly, hydrogen that has passed through the cathode gas flow channel 32 and the cathode gas passing channel 34 in each hydrogen pump unit 100A gathers in the cathode gas exhaust manifold 50. Then, the hydrogen-containing gas that has gathered is introduced to the cathode gas exhaust channel 26.

The cathode gas flow channels 32 in the hydrogen pump units 100A are connected to each other through the respective cathode gas passing channels 34 in the hydrogen pump units 100A and the cathode gas exhaust manifold 50.

Between the cathode separator 16 and the anode separator 17, between the cathode separator 16 and the cathode power feeder plate 22C, and between the anode separator 17 and the anode power feeder plate 22A, annular sealing members 40, such as O rings, are disposed so as to surround the cathode gas exhaust manifold 50 in plain view and seal the cathode gas exhaust manifold 50 appropriately.

As shown in FIG. 2A, an anode gas intake channel 29 is disposed on the anode end plate 24A. The anode gas intake channel 29 may include a pipe in which the hydrogen-containing gas to be supplied to the anode AN flows. The anode gas intake channel 29 is connected to the cylindrical anode gas intake manifold 27. The anode gas intake manifold 27 includes through holes formed in the anode end plate 24A and the members of the three-stacked hydrogen pump units 100A, and the through holes are connected to each other.

The anode gas intake manifold 27 is connected to one end portion of each of the anode gas flow channels 33 in the hydrogen pump units 100A through respective first anode gas passing channels 35. Accordingly, the hydrogen-containing gas supplied from the anode gas intake channel 29 to the anode gas intake manifold 27 is distributed to the hydrogen pump units 100A through the respective first anode gas passing channels 35 in the hydrogen pump units 100A. While passing through the anode gas flow channel 33, the distributed hydrogen-containing gas is supplied from the anode gas diffusion layer 15 to the anode catalyst layer 13.

As shown in FIG. 2A, an anode gas exhaust channel 31 is disposed on the anode end plate 24A. The anode gas exhaust channel 31 may include a pipe in which the hydrogen-containing gas discharged from the anode AN flows. The anode gas exhaust channel 31 is connected to the cylindrical anode gas exhaust manifold 30. The anode gas exhaust manifold 30 includes through-holes formed in the anode end plate 24A and the members of the three-stacked hydrogen pump units 100A, and the through-holes are connected to each other.

The anode gas exhaust manifold 30 is connected to the other end portion of each of the anode gas flow channels 33 in the hydrogen pump units 100A through respective second anode gas passing channels 36. Accordingly, hydrogen that has passed through the anode gas flow channels 33 in the hydrogen pump units 100A is supplied to the anode gas exhaust manifold 30 and gathers therein through the respective second anode gas passing channels 36. Then, the hydrogen-containing gas that has gathered is introduced into the anode gas exhaust channel 31.

Between the cathode separator 16 and the anode separator 17, between the cathode separator 16 and the cathode power feeder plate 22C, and between the anode separator 17 and the anode power feeder plate 22A, the annular sealing members 40, such as O rings, are disposed so as to surround the anode gas intake manifold 27 and the anode gas exhaust manifold 30 in plain view and seal the anode gas intake manifold 27 and the anode gas exhaust manifold 30 appropriately.

As illustrated in FIGS. 1A and 2A, the electrochemical hydrogen pump 100 includes a voltage applier 102.

The voltage applier 102 is a device that applies a voltage between the anode catalyst layer 13 and the cathode catalyst layer 12. When the voltage applier 102 applies a voltage, the electrochemical hydrogen pump 100 transfers, to the cathode catalyst layer 12, hydrogen in the hydrogen-containing gas that has been supplied to the anode catalyst layer 13 and pressurizes the hydrogen.

Specifically, the voltage applier 102 applies a high potential to the anode catalyst layer 13 and a low potential to the cathode catalyst layer 12. The voltage applier 102 may have any structure provided that the voltage applier 102 can apply a voltage between the anode catalyst layer 13 and the cathode catalyst layer 12. The voltage applier 102 may be a device that adjusts the voltage applied between the anode catalyst layer 13 and the cathode catalyst layer 12. In such a case, the voltage applier 102 includes a DC/DC converter when connected to a direct-current power source, such as a battery, a solar cell, or a fuel cell, or an AC/DC converter when connected to an alternating-current power source, such as a commercial power source.

The voltage applier 102 may be a wide-range power source in which a voltage applied between the anode catalyst layer 13 and the cathode catalyst layer 12 and a current that flows between the anode catalyst layer 13 and the cathode catalyst layer 12 are adjusted to supply a predetermined power to the hydrogen pump unit 100A.

In examples illustrated in FIGS. 1A and 2A the low-potential terminal of the voltage applier 102 is connected to the cathode power feeder plate 22C, and the high-potential terminal of the voltage applier 102 is connected to the anode power feeder plate 22A. The cathode power feeder plate 22C is in an electrical contact with the cathode separator 16 positioned at the other end in the stacking direction. The anode power feeder plate 22A is in an electrical contact with the anode separator 17 positioned at one end in the stacking direction.

Configuration of Hydrogen Supply System

Figure 3:
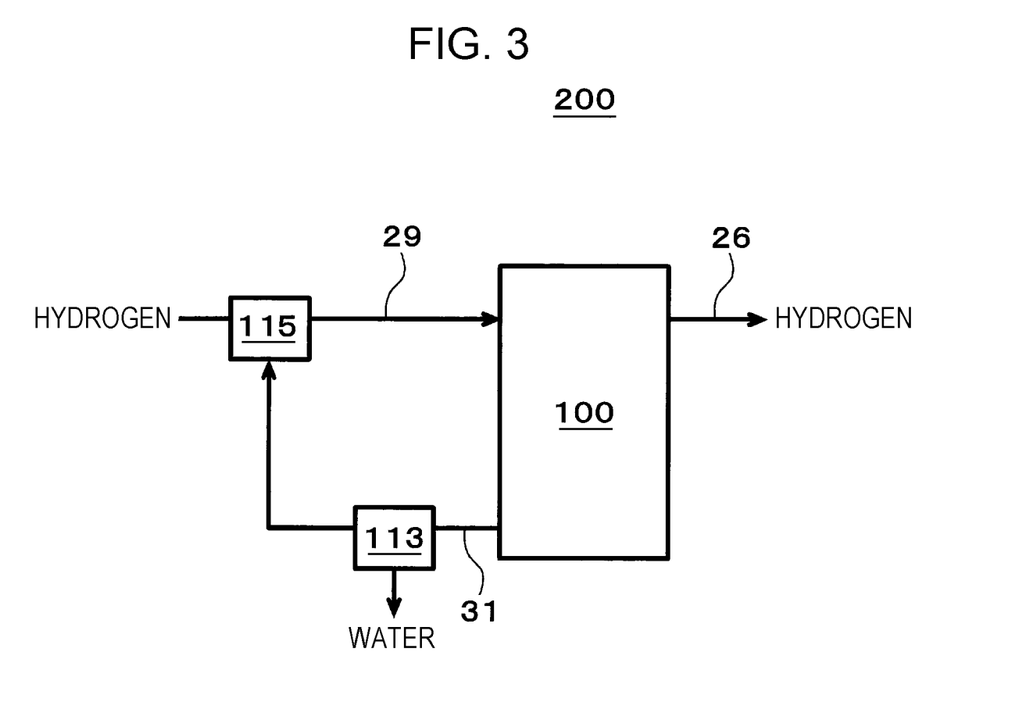
FIG. 3 is a view of an exemplary hydrogen supplying system including the electrochemical hydrogen pump according to the embodiment.

FIG. 3 is a view of an exemplary hydrogen supplying system including the electrochemical hydrogen pump according to the embodiment.

As illustrated in FIG. 3, a hydrogen supply system 200 according to the present embodiment includes a dew point adjusting unit 115 that adjusts the dew point of a gas mixture in which the hydrogen-containing gas having high humidity discharged from the anode AN through the anode gas exhaust channel 31 and the hydrogen-containing gas having low humidity supplied from an external hydrogen supplier through the anode gas intake channel 29 are mixed together. In other words, the hydrogen supply system 200 has a configuration in which a gas mixture having a dew point adjusted by the dew point adjusting unit 115 is supplied to the anode AN in the electrochemical hydrogen pump 100 through the anode gas intake channel 29. In such a case, the hydrogen-containing gas supplied from the external hydrogen supplier may be generated by a water electrolysis device (not shown).

Accordingly, the hydrogen supply system 200 according to the present embodiment can maintain the hydrogen pressurizing operation of the electrochemical hydrogen pump 100 highly efficiently, compared with that in the prior art. Specifically, if the above gas mixture is not enough humidified, the proton conductivity of the electrolyte membrane 11 may decrease; however, the hydrogen supply system 200 according to the present embodiment can appropriately adjust the dew point of the gas mixture, and thus, such a risk can be decreased. If the above gas mixture is excessively humidified, water vapor in the gas mixture condenses, and the condensed water may cause flooding of the anode AN in the electrochemical hydrogen pump 100; however, the hydrogen supply system 200 according to the present embodiment can appropriately adjust the dew point of the gas mixture, and thus, such a risk can be decreased.

The dew point adjusting unit 115 may have any structure provided that the dew point adjusting unit 115 can adjust the dew point of the gas mixture. The dew point adjusting unit 115 may include a bubbler-type device. Such a bubbler-type device may include a bubbling tank that stores warm water, a water heater, and a temperature measuring unit of the warm water. In such a case, the humidification of the gas mixture can be adjusted by adjusting the temperature of the warm water in the bubbling tank. In other words, after the gas mixture passes through the warm water, the dew point of the gas mixture is nearly identical to the temperature of the warm water. Thus, the dew point adjusting unit 115 can humidify or dehumidify the gas mixture in response to the moisture in the gas mixture before the gas mixture passes through the warm water, so that the dew point adjusting unit 115 can function as a humidifier that humidifies the gas mixture and as a dehumidifier that dehumidifies the gas mixture.

When the dew point of the hydrogen-containing gas discharged from the anode AN in the electrochemical hydrogen pump 100 is high, the water vapor in the hydrogen-containing gas may condense in the anode gas exhaust channel 31 due to a decrease in the temperature of the hydrogen-containing gas. This may degrade the stability of the flow of the hydrogen-containing gas in the anode gas exhaust channel 31. If the condensed water flows with the hydrogen-containing gas into the dew point adjusting unit 115 through the anode gas exhaust channel 31, the dew point adjustment of the gas mixture in the dew point adjusting unit 115 may be degraded.

The hydrogen supply system 200 according to the present embodiment includes a condense unit 113, which condenses the moisture in the hydrogen-containing gas discharged from the anode AN before the hydrogen-containing gas discharged from the anode AN is mixed with the hydrogen-containing gas supplied from the external hydrogen supplier. In other words, the condense unit 113 is disposed on the anode gas exhaust channel 31 between the hydrogen gas outlet of the anode AN and the dew point adjusting unit 115. A water discharge channel (not shown) that discharges condensed water obtained by condensing the moisture in the hydrogen-containing gas in the condense unit 113 may be disposed with the condense unit 113 integrally, or disposed on the anode gas exhaust channel 31 separately from the condense unit 113.

In addition to the above units and devices, units and devices needed for the hydrogen pressurizing operation of the electrochemical hydrogen pump 100 and the hydrogen supplying operation of the hydrogen supply system 200 are appropriately provided.

The hydrogen supply system 200 may include a temperature measuring unit that measures the temperature of the electrochemical hydrogen pump 100, a hydrogen storage unit that temporarily stores hydrogen discharged from the cathode CA in the electrochemical hydrogen pump 100, a pressure measuring unit that measures the pressure of the hydrogen gas in the hydrogen storage unit, a solenoid valve that opens and closes the anode gas exhaust channel 31 at an appropriate time, and a solenoid valve that opens and closes, at an appropriate time, a channel in which hydrogen flows and which is between the electrochemical hydrogen pump 100 and the hydrogen storage unit.

The hydrogen supply system 200 may include a controlling unit that controls the operation of the hydrogen supply system 200. Such a controlling unit may include an arithmetic circuit (not shown) and a memory circuit (not shown) that stores a controlling program. Examples of the arithmetic circuit include MPU and CPU. The memory circuit may be a memory. The controlling unit may include a single controlling unit that performs a centralized control or a plurality of controlling units that perform a distributed control cooperatively.

The hydrogen supply system 200 may include a touch panel-type display. This displays the operating state of the hydrogen supply system 200 and enables an operator to input a controlling command to the hydrogen supply system 200 therethrough.

The above structure of the electrochemical hydrogen pump 100 and the configuration of the hydrogen supply system 200 are examples, and the structure and the configuration are not limited to the examples.

A dead-end structure in which the anode gas exhaust manifold 30 and the anode gas exhaust channel 31 are not disposed and in which all the hydrogen-containing gas that has been supplied to the anode AN through the anode gas intake manifold 27 is pressurized in the cathode CA may be used.

As described above, the hydrogen-containing gas flows in the anode gas flow channel 33, and hydrogen ($H_2$) flows in the cathode gas flow channel 32. The hydrogen concentration in such gases does not need to be 100%. The hydrogen-containing gas having a predetermined hydrogen concentration flows in such channels.

Operation

Hereinafter, an exemplary hydrogen pressurizing operation of the electrochemical hydrogen pump 100 will be described with reference to the drawings.

The following operation may be performed such that the arithmetic circuit of a controlling unit (not shown) reads out a controlling program from the memory circuit of the controlling unit. The following operation does not need to be performed by a controlling unit. The following operation may be partially performed by an operator.

First, a low-pressure hydrogen-containing gas is supplied to the anode AN in the electrochemical hydrogen pump 100, and the voltage applier 102 applies a voltage to the electrochemical hydrogen pump 100.

Then, in the anode catalyst layer 13 of the anode AN, a hydrogen molecule in the hydrogen-containing gas is separated by the oxidation reaction into hydrogen ions (protons) and electrons (Formula (1)). The protons transfer to the cathode catalyst layer 12 through the electrolyte membrane 11. The electrons transfer to the cathode catalyst layer 12 through the voltage applier 102.

Then, in the cathode catalyst layer 12, a hydrogen molecule is regenerated by the reduction reaction (Formula (2)). It is known that when the protons transfer through the electrolyte membrane 11, a certain amount of water transfers, as electro-osmotic water, with the protons from the anode AN to the cathode CA.

The hydrogen ($H_2$) generated in the cathode CA can be pressurized by increasing a pressure loss in a hydrogen exhaust channel by using a flow rate adjusting unit (not shown). Examples of the hydrogen exhaust channel include the cathode gas exhaust channels 26 in FIGS. 1A and 3. The flow rate adjusting unit may be a back pressure regulating valve disposed in the hydrogen exhaust channel or a regulating valve disposed in the hydrogen exhaust channel.

$$\text{anode: } H_2(\text{low pressure}) \rightarrow 2H^+ + 2e^- \quad (1)$$

$$\text{cathode: } 2H^+ + 2e^- \rightarrow H_2(\text{high pressure}) \quad (2)$$

When the voltage applier 102 applies a voltage, the electrochemical hydrogen pump 100 pressurizes, in the cathode CA, hydrogen in the hydrogen-containing gas that has been supplied to the anode AN. Accordingly, the hydrogen pressurizing operation of the electrochemical hydrogen pump 100 is performed, and the hydrogen pressurized in the cathode CA is temporarily stored in, for example, a hydrogen storage unit (not shown). The hydrogen stored in the hydrogen storage unit is supplied to a hydrogen demanding object at an appropriate time. The hydrogen demanding object may be a fuel cell that generates power by using hydrogen.

In the electrochemical hydrogen pump 100 according to the present embodiment, the cathode gas diffusion layer 14 includes the water-repellent carbon fiber layer 14R in a main surface of the cathode gas diffusion layer 14 that is on the side of the cathode catalyst layer 12, and thus, the electrochemical hydrogen pump 100 can improve the efficiency during the hydrogen pressurizing operation, compared with that in the prior art. Hereinafter, the reason will be fully described.

When the current flows between the anode AN and the cathode CA in the electrochemical hydrogen pump 100, protons transfer with water from the anode AN to the cathode CA through the electrolyte membrane 11. The water transferred from the anode AN to the cathode CA is in the vapor state when the operation temperature of the electrochemical hydrogen pump 100 is equal to or higher than a predetermined temperature. As the hydrogen gas pressure in the cathode CA increases, the proportion of water in the liquid state increases. When liquid water is present in the cathode CA, such water is partially transferred back to the anode AN due to a difference in pressure between the cathode CA and the anode AN. The amount of water transferred back to the anode AN increases as the hydrogen gas pressure in the cathode CA increases. As the hydrogen gas pressure in the cathode CA increases, water transferred back to the anode AN is likely to cause flooding of the anode AN. When the diffusivity of the hydrogen-containing gas in the anode AN is degraded due to the occurrence of flooding, the diffusion resistance of the electrochemical hydrogen pump 100 may increase. This may degrade the efficiency of the hydrogen pressurizing operation of the electrochemical hydrogen pump 100.

In the hydrogen pressurizing operation of the electrochemical hydrogen pump 100, the hydrogen gas pressure in the cathode CA increases and presses the electrolyte membrane 11, the anode catalyst layer 13, and the anode gas diffusion layer 15. Then, due to such pressing, the electrolyte membrane 11, the anode catalyst layer 13, and the anode gas diffusion layer 15 are compressed. Accordingly, the higher the hydrogen gas pressure in the cathode CA, the larger the amount of compression (amount of distortion) of the electrolyte membrane 11, the anode catalyst layer 13, and the anode gas diffusion layer 15 due to the hydrogen gas pressure. If adhesion between the cathode catalyst layer 12 and the cathode gas diffusion layer 14 is low, a gap is likely to be generated therebetween. If a gap is generated between the cathode catalyst layer 12 and the cathode gas diffusion layer 14, the contact resistance therebetween increases. Then, a voltage applied by the voltage applier 102 increases, and this may degrade the efficiency of the hydrogen pressurizing operation of the electrochemical hydrogen pump 100.

Thus, in the electrochemical hydrogen pump 100 according to the present embodiment, the cathode gas diffusion layer 14 is disposed in the recess of the cathode separator 16 with the cathode gas diffusion layer 14 protruded from the recess by a predetermined amount in the thickness direction before fastening of the hydrogen pump unit 100A due to the fastener 25.

Figure 4:
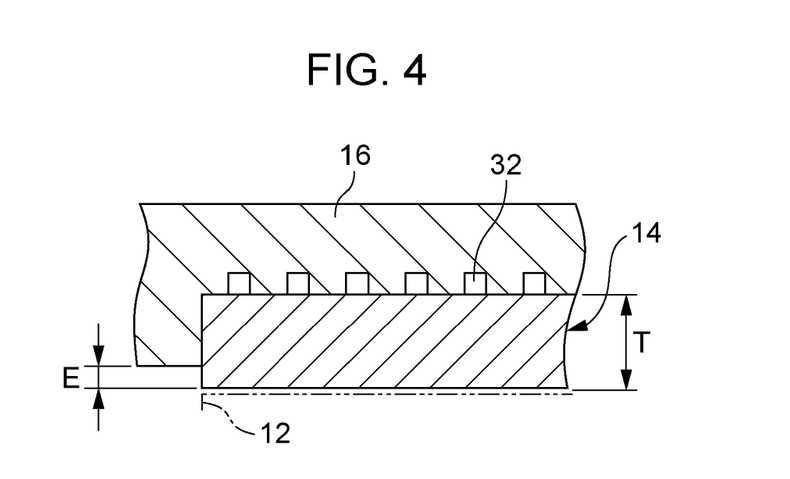
FIG. 4 is a view of an exemplary cathode gas diffusing layer in the electrochemical hydrogen pump according to the embodiment.

Specifically, as illustrated in FIG. 4, before fastening of the hydrogen pump unit 100A due to the fastener 25, the cathode gas diffusion layer 14 is disposed so as to protrude from the recess of the cathode separator 16 by a desired amount of protrusion E in the thickness direction. During fastening of the hydrogen pump unit 100A, the fastening force of the fastener 25 compresses the cathode gas diffusion layer 14 by the above amount of protrusion E in a direction in which the members in the hydrogen pump unit 100A are stacked on each other. In other words, due to fastening of the fastener 25, the cathode gas diffusion layer 14 can be compressed in the thickness direction. Thus, if the hydrogen gas pressure in the cathode CA increases, the cathode gas diffusion layer 14 elastically deforms in a direction in which the thickness (T-E) after compression due to the fastener 25 returns to the thickness T before compression. Accordingly, the contact between the cathode catalyst layer 12 and the cathode gas diffusion layer 14 can be appropriately maintained.

Such a structure in which the cathode gas diffusion layer 14 is compressed in the thickness direction due to fastening of the fastener 25, however, has a risk of promoting the occurrence of the above flooding of the anode AN. Specifically, due to the above structure, the voids of the cathode gas diffusion layer 14 decrease, thereby preventing the flow of hydrogen in the cathode gas diffusion layer 14. Then, the amount of water discharged with the flow of hydrogen from the cathode CA decreases, thereby increasing the amount of water temporally retained in the cathode gas diffusion layer 14. As a result, the amount of water transferred back to the anode AN due to a difference in pressure between the cathode CA and anode AN further increases, and thus, the occurrence of flooding of the anode AN is promoted.

In the electrochemical hydrogen pump 100 according to the present embodiment, however, the cathode gas diffusion layer 14 includes the water-repellent carbon fiber layer 14R in a main surface of the cathode gas diffusion layer 14 that is on the side of the cathode catalyst layer 12, as described above. The water repellency of the carbon fiber layer 14R suppresses the transfer of cathode CA water outside of the carbon fiber layer 14R back to the anode AN due to a difference in pressure between the cathode CA and the anode AN. As a result, water outside the carbon fiber layer 14R is likely to be discharged with hydrogen from the cathode CA to the outside. Note that when a side of the carbon fiber layer 14R that is on the side of the cathode catalyst layer 12 is referred to as the inside of the carbon fiber layer 14R, the outside of the carbon fiber layer 14R refers to the opposite side of the carbon fiber layer 14R. In other words, the outside of the carbon fiber layer 14R refers to the side thereof on the side of the cathode separator 16.

Accordingly, the electrochemical hydrogen pump 100 according to the present embodiment suppresses the occurrence of flooding of the anode AN and thus can decrease the risk of degrading the diffusivity of the hydrogen-containing gas in the anode AN, compared with an electrochemical hydrogen pump in which the cathode gas diffusion layer 14 does not include the water-repellent carbon fiber layer 14R. Therefore, the electrochemical hydrogen pump 100 according to the present embodiment reduces an increase in the diffusion resistance of the electrochemical hydrogen pump 100 and thus can improve the efficiency during the hydrogen pressurizing operation.

First Example

The electrochemical hydrogen pump 100 according to the present embodiment is identical to the electrochemical hydrogen pump 100 according to the embodiment, except that the amount of compression of the cathode gas diffusion layer 14 in the stacking direction due to fastening of the fastener 25 is equal to or larger than the sum of the amounts of distortion of the electrolyte membrane 11, the anode catalyst layer 13, and the anode gas diffusion layer 15 in the stacking direction under the maximum pressure of the electrochemical hydrogen pump 100. Accordingly, the description about the structures common to both electrochemical hydrogen pumps is omitted.

The maximum pressure of the electrochemical hydrogen pumps 100 can be appropriately determined in accordance with the structure and the operating conditions of the hydrogen supply system 200. The maximum pressure of the electrochemical hydrogen pump 100 may be about 20 MPa, about 40 MPa, or about 80 MPa.

In the electrochemical hydrogen pump 100 according to the present example, the amount of compression of the cathode gas diffusion layer 14 in the stacking direction due to fastening of the fastener 25 is appropriately determined in consideration of the sum of the amounts of distortion of the electrolyte membrane 11, the anode catalyst layer 13, and the anode gas diffusion layer 15 in the stacking direction under the maximum pressure of the electrochemical hydrogen pump 100. Accordingly, under the maximum pressure of the electrochemical hydrogen pump 100, the cathode gas diffusion layer 14 elastically deforms in a direction in which the thickness (T-E) after compression due to the fastener 25 returns to the original thickness T before compression, and thus, the electrochemical hydrogen pump 100 according to the present example can appropriately maintain the contact between the cathode catalyst layer 12 and the cathode gas diffusion layer 14.

The electrochemical hydrogen pump 100 in the present example may be identical to the electrochemical hydrogen pump 100 according to the embodiment, except for the above feature.

Second Example

The electrochemical hydrogen pump 100 according to the present example is identical to the electrochemical hydrogen pump 100 according to the embodiment, except that the amount of compression of the cathode gas diffusion layer 14 due to fastening of the fastener 25 in a stacking direction in which the members in the hydrogen pump unit 100A are stacked on each other is determined to be in a range that will be described hereinafter. Accordingly, the description about the structures common to both electrochemical hydrogen pumps is omitted.

In a case in which the amount of compression of the cathode gas diffusion layer 14 in the stacking direction (thickness direction) due to fastening of the fastener 25 is smaller than a predetermined appropriate amount, when the hydrogen gas pressure in the cathode CA increases, the cathode gas diffusion layer 14 may fail to appropriately follow the distortion of the electrolyte membrane 11, the anode catalyst layer 13, and the anode gas diffusion layer 15 in the stacking direction. In such a case, it is difficult to appropriately maintain the contact between the cathode catalyst layer 12 and the cathode gas diffusion layer 14. As a result, the contact resistance between the cathode catalyst layer 12 and the cathode gas diffusion layer 14 increases.

On the other hand, in a case in which the amount of compression of the cathode gas diffusion layer 14 in the stacking direction (thickness direction) due to fastening of the fastener 25 is larger than a predetermined appropriate amount, the compression force of the cathode gas diffusion layer 14 in the stacking direction (thickness direction) increases. In such a case, the compression force is applied in a direction in which the electrolyte membrane 11, the anode catalyst layer 13, and the anode gas diffusion layer 15 are crushed. Then, for example, paths through which water passes decrease in the anode catalyst layer 13, and water retains in the anode catalyst layer 13. This is likely to cause flooding of the anode AN.

An appropriate range of the amount of compression of the cathode gas diffusion layer 14 in the stacking direction (thickness direction) due to fastening of the fastener 25 is determined by conducting the following test in which a cathode gas diffusion layer is compressed in the thickness direction.

Figure 5A:
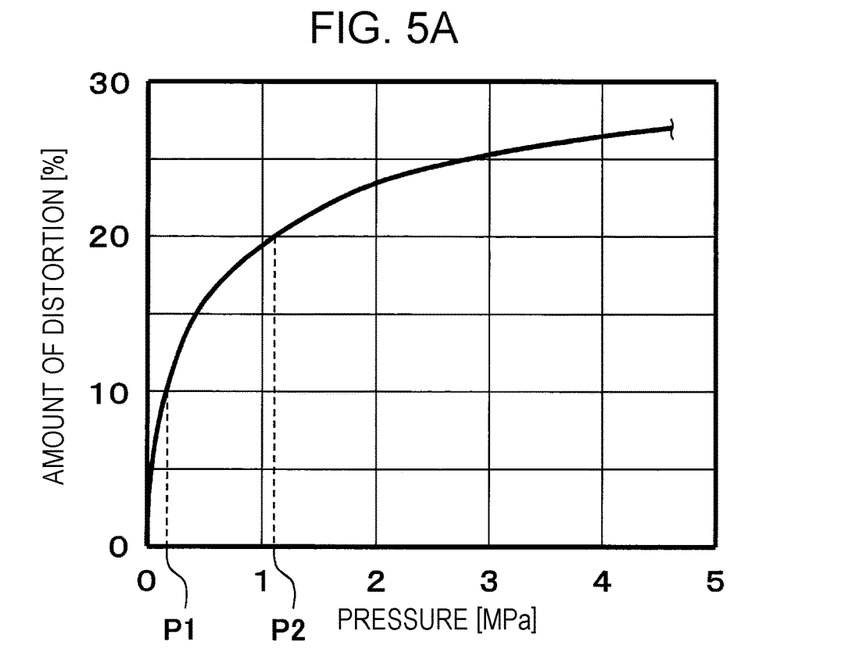
FIG. 5A is a graph of an exemplary relation between the surface pressure (pressure) and the amount of distortion of a cathode gas diffusion layer when the cathode gas diffusion layer is compressed in the thickness direction.

FIG. 5A is a graph of an exemplary relation between the surface pressure (pressure) and the amount of distortion of a cathode gas diffusion layer when the cathode gas diffusion layer is compressed in the thickness direction. The amount of distortion (%) represented by the vertical axis of FIG. 5A is a value obtained by dividing the amount of compression of the cathode gas diffusion layer in the thickness direction of the cathode gas diffusion layer by the thickness of the cathode gas diffusion layer before the cathode gas diffusion layer is compressed in the thickness direction.

Figure 5B:
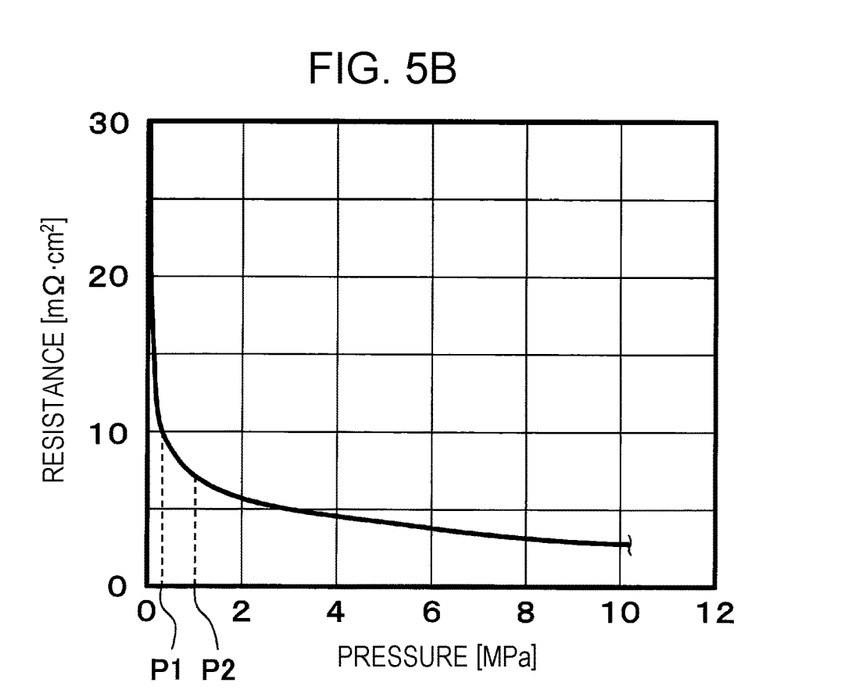
FIG. 5B is a graph of an exemplary relation between the surface pressure (pressure) and the resistance of a cathode gas diffusion layer when the cathode gas diffusion layer is compressed in the thickness direction.

FIG. 5B is a graph of an exemplary relation between the surface pressure (pressure) and the resistance of a cathode gas diffusion layer when the cathode gas diffusion layer is compressed in the thickness direction.

FIGS. 5A and 5B schematically show the data, which are measurement values obtained by placing a cathode gas diffusion layer on the sample stage of an appropriate compression testing apparatus (not shown) and repeatedly applying and removing a compression force with respect to the cathode gas diffusion layer. The data of FIG. 5B were obtained by placing an electrode for measuring the resistance of the cathode gas diffusion layer so as to be in contact with the cathode gas diffusion layer.

As shown in FIG. 5B, it has been found that the resistance of the cathode gas diffusion layer surges as the surface pressure decreases in a pressure range lower than the surface pressure P1 (see FIG. 5A) of the cathode gas diffusion layer. The surface pressure P1 corresponds to 10% of the amount of distortion of the cathode gas diffusion layer. Therefore, the amount of compression of the cathode gas diffusion layer 14 in the stacking direction due to fastening of the fastener 25 is desirably equal to or larger than 10% of the thickness of the cathode gas diffusion layer 14 before fastening of the fastener 25. This appropriately suppresses an increase in the resistance between the cathode gas diffusion layer 14 and the cathode catalyst layer 12.

As shown in FIG. 5B, it has been found that the resistance of the cathode gas diffusion layer is low in a pressure range equal to or higher than the surface pressure P2 (see FIG. 5A) of the cathode gas diffusion layer. The surface pressure P2 corresponds to 20% of the amount of distortion of the cathode gas diffusion layer. Therefore, the amount of compression of the cathode gas diffusion layer 14 in the stacking direction due to fastening of the fastener 25 is desirably equal to or larger than 20% of the thickness of the cathode gas diffusion layer 14 before fastening of the fastener 25. This appropriately maintains the resistance between the cathode gas diffusion layer 14 and the cathode catalyst layer 12 stably low.

As shown in FIG. 5A, in consideration of the limit of deformation of the cathode gas diffusion layer 14, the amount of compression of the cathode gas diffusion layer 14 in the stacking direction due to fastening of the fastener 25 is desirably equal to or smaller than 30% of the thickness of the cathode gas diffusion layer 14 before fastening of the fastener 25.

The electrochemical hydrogen pump 100 in the present example may be identical to the electrochemical hydrogen pump 100 according to the embodiment or the electrochemical hydrogen pump 100 in the first example, except for the above feature.

Third Example

The electrochemical hydrogen pump 100 in the present example is identical to the electrochemical hydrogen pump 100 according to the embodiment, except that the electrochemical hydrogen pump 100 includes a water-repellent layer containing a water-repellent resin and carbon black on a main surface of the water-repellent carbon fiber layer 14R that is on the side of the cathode catalyst layer 12. Accordingly, the description about the structures common to both electrochemical hydrogen pumps is omitted.

A material containing a water-repellent resin, such as a fluorine-based resin, and carbon black, may be applied to the cathode gas diffusion layer 14 containing carbon fibers to form a water-repellent layer on a main surface of the water-repellent carbon fiber layer 14R that is on the side of the cathode catalyst layer 12. In other words, in such a case, the water-repellent layer is stacked on the water-repellent carbon fiber layer 14R of the cathode gas diffusion layer 14. The material containing a water-repellent resin and carbon black may be a solution in which PTFE particulates and carbon black are dispersed in the solvent. The method for applying such a material may be a spray application method.

The application time may be increased to allow a part of the solution to permeate the water-repellent carbon fiber layer 14R to form a mixture layer in which the water-repellent carbon fiber layer 14R and a water-repellent layer are mixed together and to provide the mixture layer with the stacked water-repellent layer. Such a method for forming the water-repellent layer and the structure thereof are examples, and the method and the structure are not limited to the examples.

Accordingly, the electrochemical hydrogen pump 100 according to the present example includes a water-repellent layer containing a water-repellent resin and carbon black, so that the cathode gas diffusion layer 14 can exhibit water repellency effectively due to the water-repellent carbon fiber layer 14R and the water-repellent layer.

The electrochemical hydrogen pump 100 according to the present example includes the water-repellent layer between the carbon fiber layer 14R and the cathode catalyst layer 12, so that the water-repellent layer can also function as a protective layer that can appropriately prevent the carbon fibers from piercing the cathode catalyst layer 12 and the electrolyte membrane 11.

The electrochemical hydrogen pump 100 in the present example may be identical to any one of the electrochemical hydrogen pump 100 according to the embodiment and the electrochemical hydrogen pumps 100 in the first and second examples of the embodiment, except for the above feature.

Fourth Example

The electrochemical hydrogen pump 100 in the present example is identical to the electrochemical hydrogen pump 100 according to the embodiment, except that, in a main surface of the water-repellent carbon fiber layer 14R that is on the side of the cathode catalyst layer 12, the water-repellent carbon fiber layer 14R includes a mixture layer in which the water-repellent carbon fiber layer 14R and a water-repellent layer containing a water-repellent resin and carbon black are mixed together. Accordingly, the description about the structures common to both electrochemical hydrogen pumps is omitted.

The cathode gas diffusion layer 14 containing carbon fibers may be impregnated with a material containing a water-repellent resin, such as a fluorine-based resin, and carbon black to form a mixture layer in which the water-repellent carbon fiber layer 14R and a water-repellent layer containing the water-repellent resin and carbon black are mixed together. In other words, in such a case, a water-repellent layer is not stacked on the main surface of the water-repellent carbon fiber layer 14R, and only the water-repellent mixture layer is provided in the main surface of the carbon fiber layer 14R. The material containing a water-repellent resin and carbon black may be a solution in which PTFE particulates and carbon black are dispersed in the solvent. Such a method for forming the water-repellent mixture layer and the structure thereof are examples, and the method and the structure are not limited to the examples.

Accordingly, the electrochemical hydrogen pump 100 according to the present embodiment includes a mixture layer in which carbon fibers have water repellency and in which a water-repellent resin and carbon black are present in the voids between the carbon fibers, so that the cathode gas diffusion layer 14 can exhibit water repellency effectively.

The electrochemical hydrogen pump 100 in the present example may be identical to any one of the electrochemical hydrogen pump 100 according to the embodiment and the electrochemical hydrogen pumps 100 in the first to third examples of the embodiment, except for the above feature.

First Modified Example

The electrochemical hydrogen pump 100 according to the present modified example is identical to the electrochemical hydrogen pump 100 according to the embodiment, except that the anode gas diffusion layer 15 includes a metal sheet including a plurality of ventilation pores and does not include a carbon fiber layer. Accordingly, the description about the structures common to both electrochemical hydrogen pumps is omitted.

Examples of the metal sheet including a plurality of ventilation pores include metal members, such as sheet-shaped metal-fiber sintered bodies and sheet-shaped metal-powder sintered bodies. Such metal sheets typically have higher stiffness than carbon fiber layers. The electrochemical hydrogen pump 100 in the present modified example has a structure in which the anode gas diffusion layer 15 does not include a carbon fiber layer, so that the anode gas diffusion layer 15 can have high stiffness and suppress displacement and deformation of the component members due to a difference in pressure between the anode AN and the cathode CA during the operation of the electrochemical hydrogen pump 100. In other words, due to such a structure, the elastic modulus of the anode gas diffusion layer 15 is higher than the elastic modulus of the cathode gas diffusion layer 14.

The electrochemical hydrogen pump 100 in the present modified example may be identical to any one of the electrochemical hydrogen pump 100 according to the embodiment and the electrochemical hydrogen pumps 100 in the first to fourth examples of the embodiment, except for the above feature.

Second Modified Example

The electrochemical hydrogen pump 100 in the present modified example is identical to the electrochemical hydrogen pump 100 according to the embodiment, except that the anode gas diffusion layer 15 includes a water-repellent layer in a main surface of the anode gas diffusion layer 15 that is on the side of the anode catalyst layer 13. Accordingly, the description about the structures common to both electrochemical hydrogen pumps is omitted.

In a case in which the anode gas diffusion layer 15 includes a metal fiber sintered body or a metal powder sintered body, the metal fiber sintered body or the metal powder sintered body may be impregnated with a material containing a water-repellent resin, such as a fluorine-based resin, to enable the metal fiber or the metal powder to exhibit water repellency. The material containing a water-repellent resin may be a solution in which PTFE particulates are dispersed in the solvent. Such a method for forming the water-repellent layer and the structure thereof are examples, and the method and the structure are not limited to the examples.

In such a water-repellent layer, water in the anode AN is likely to transfer with the hydrogen containing gas from the anode AN to the anode gas exhaust manifold 30 due to the flow of the hydrogen-containing gas in the anode AN. In the electrochemical hydrogen pump 100 according to the present modified example, the anode gas diffusion layer 15 includes a water-repellent layer in a main surface thereof that is on the side of the anode catalyst layer 13. This improves a state in which excessive water is retained in the anode gas diffusion layer 15, thereby suppressing the occurrence of flooding of the anode AN appropriately.

The electrochemical hydrogen pump 100 in the present modified example may be identical to any one of the electrochemical hydrogen pump 100 according to the embodiment and the electrochemical hydrogen pumps 100 in the first to fourth examples and the first modified example of the embodiment, except for the above feature.

Third Modified Example

In the electrochemical hydrogen pumps 100 in the third and fourth examples, the water-repellent layer containing a water-repellent resin and carbon black is produced by applying a material containing a water-repellent resin and carbon black or impregnating a layer with such a material; however, the production method is not limited thereto.

In the present modified example, a water-repellent layer sheet containing a water-repellent resin and carbon black is produced and disposed on the carbon fiber layer. For such a sheet, a porous sheet material obtained by kneading and rolling carbon black and an elastomer, such as PTFE, may be used.

The electrochemical hydrogen pump 100 in the present modified example may be identical to any one of the electrochemical hydrogen pump 100 according to the embodiment and the electrochemical hydrogen pumps 100 in the first to fourth examples and the first and second modified examples of the embodiment, except for the above feature.

The embodiment, the first to fourth examples of the embodiment, and the first to third modified examples of the embodiment may be combined with each other provided that they are compatible with each other.

From the above description, those skilled in the art will appreciate numerous modifications and other embodiments of the present disclosure. Accordingly, the above description is understood to be illustrative only and is provided to teach those skilled in the art the best mode to perform the present disclosure. The structure and/or the function may be substantially changed within the spirit of the present disclosure.

One aspect of the present disclosure can be applied to an electrochemical hydrogen pump that can improve the efficiency during the hydrogen pressurizing operation compared with that in the prior art.

What is claimed is:

1. An electrochemical hydrogen pump comprising:
    an electrolyte membrane;
    an anode catalyst layer disposed on one main surface of the electrolyte membrane;
    a cathode catalyst layer disposed on another main surface of the electrolyte membrane;
    an anode gas diffusion layer disposed on the anode catalyst layer;
    a cathode gas diffusion layer disposed on the cathode catalyst layer;
    an anode separator disposed on the anode gas diffusion layer;
    a cathode separator disposed on the cathode gas diffusion layer,
    a first end plate and a second end plate that are disposed on respective ends of at least one hydrogen pump unit in a stacking direction in which the electrolyte membrane, the anode catalyst layer, the cathode catalyst layer, the anode gas diffusion layer, the cathode gas diffusion layer, the anode separator, and the cathode separator are stacked on each other in the at least one hydrogen pump unit;
    a fastener that fastens the at least one hydrogen pump unit, the first end plate, and the second end plate in the stacking direction; and
    a voltage applier that applies a voltage between the anode catalyst layer and the cathode catalyst layer, wherein:

the electrochemical hydrogen pump transfers, to the cathode catalyst layer, hydrogen in a hydrogen-containing gas that has been supplied to the anode catalyst layer and pressurizes the hydrogen when the voltage applier applies the voltage, the cathode gas diffusion layer includes a water-repellent carbon fiber layer in a main surface of the cathode gas diffusion layer that is on a side of the cathode catalyst layer, and is compressed due to fastening of the fastener, during a hydrogen pressurizing operation of the electrochemical hydrogen pump, the electrolyte membrane, the anode catalyst layer, and the anode gas diffusion layer are compressed causing a distortion of the electrolyte membrane, the anode catalyst layer, and the anode gas diffusion layer, where the higher a pressure in the electrochemical hydrogen pump is, the larger the distortion is, and an amount of compression of the cathode gas diffusion layer in the stacking direction due to fastening of the fastener is equal to or larger than a sum of amounts of the distortion of the electrolyte membrane, the anode catalyst layer, and the anode gas diffusion layer in the stacking direction under a maximum pressure of the electrochemical hydrogen pump.

2. The electrochemical hydrogen pump according to claim 1, wherein the amount of compression of the cathode gas diffusion layer in the stacking direction due to fastening of the fastener is 20% to 30% of a thickness of the cathode gas diffusion layer before fastening of the fastener.

3. The electrochemical hydrogen pump according to claim 1, wherein the amount of compression of the cathode gas diffusion layer in the stacking direction due to fastening of the fastener is equal to or larger than 10% of a thickness of the cathode gas diffusion layer before fastening of the fastener.

4. The electrochemical hydrogen pump according to claim 1, comprising a water-repellent layer containing a water-repellent resin and carbon black on a main surface of the water-repellent carbon fiber layer that is on the side of the cathode catalyst layer.

5. The electrochemical hydrogen pump according to claim 1, wherein, in a main surface of the water-repellent carbon fiber layer that is on the side of the cathode catalyst layer, the water-repellent carbon fiber layer includes a mixture layer in which the water-repellent carbon fiber layer and a water-repellent layer containing a water-repellent resin and carbon black are mixed together.

6. The electrochemical hydrogen pump according to claim 1, wherein the anode gas diffusion layer includes a metal sheet including a plurality of ventilation pores and does not include the carbon fiber layer.

7. The electrochemical hydrogen pump according to claim 6, wherein the anode gas diffusion layer includes a water-repellent layer in a main surface of the anode gas diffusion layer that is on a side of the anode catalyst layer.

8. The electrochemical hydrogen pump according to claim 1, wherein the at least one hydrogen pump unit includes a plurality of the hydrogen pump units.

* * * * *